March 1, 1949.  A. E. MYNARD  2,463,411
FEED MECHANISM FOR SOUND FILM
Filed Jan. 18, 1946
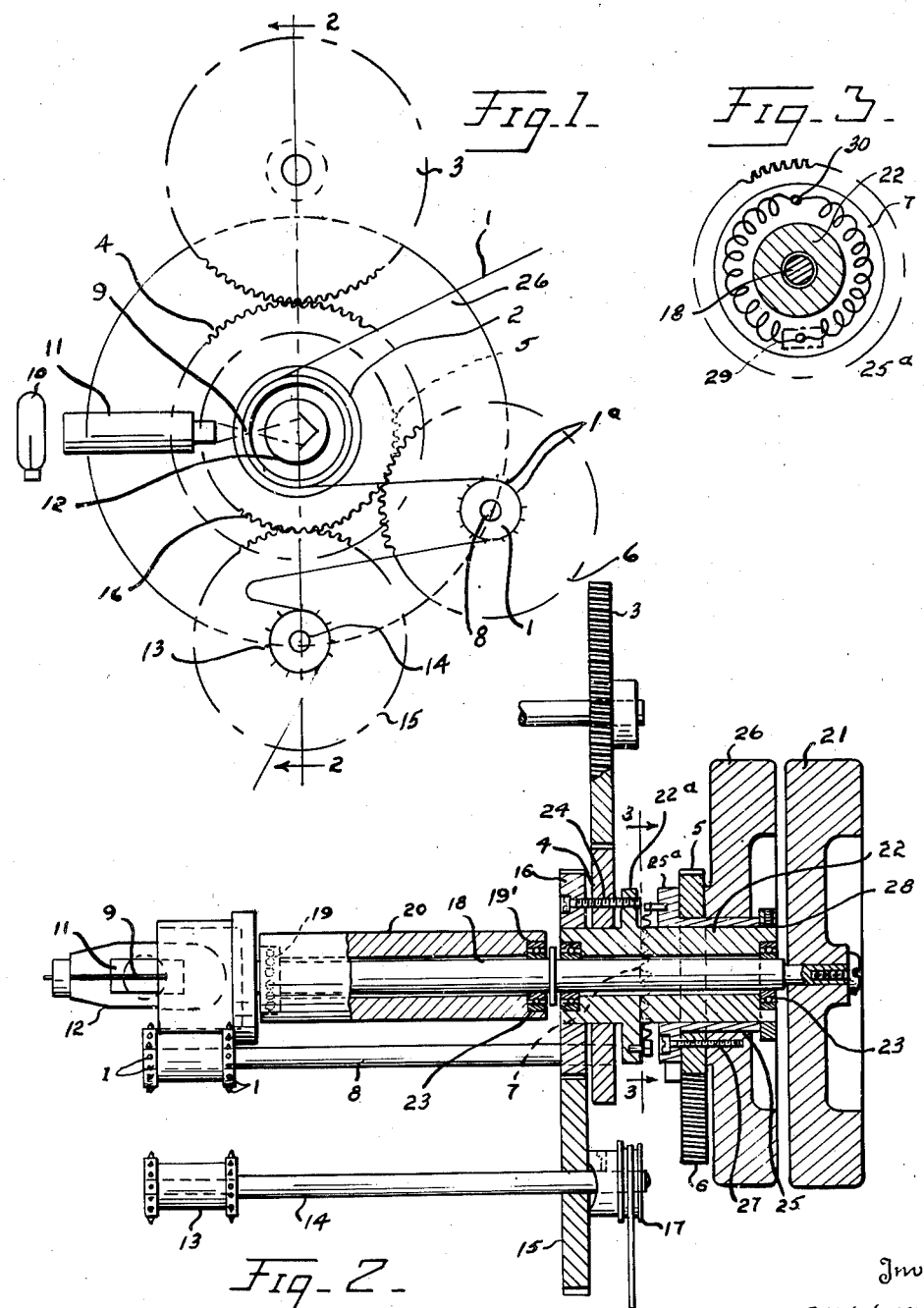
Inventor
ALFRED EDWIN MYNARD
By Jerome W. Payton
AGENT

UNITED STATES PATENT OFFICE 2,463,411

FEED MECHANISM FOR SOUND FILM

Alfred Edwin Mynard, Leicester, England

Application January 18, 1946, Serial No. 641,986
In Great Britain February 15, 1945

6 Claims. (Cl. 271—2.3)

This invention appertains to feed mechanism for propelling sound film through the appropriate apparatus during sound recording, film printing or sound reproducing operations, and has reference particularly to such mechanism of the kind comprising in combination a continuously drivable sprocket having teeth for engagement with spaced sprocket holes in the film, and freely rotatable drum or the like around which the film passes in frictional contact therewith to smooth out the slight interruptions of speed resulting from the engagement of the teeth with the sprocket holes.

In sound film feed mechanism of this kind the shaft or spindle of the continously driven sprocket, hereinafter for convenience referred to as the "sound sprocket shaft," is usually associated with a balanced flywheel, and means of any suitable character, such for instance as an arrangement of springs or equivalent, are incorporated to provide a resilient or a flexible drive between this shaft and the means employed for rotating it. This construction is such that the speed of the sound sprocket shaft is maintained substantially constant, thereby, in the case of a sound reproducing apparatus, obviating the phenomenon customarily known as "wow"—caused by variations in the motor drive and the uneven take-up of the bottom film spool. To those acquainted with the art concerned the means incorporated to provide a resilient or a flexible drive as aforesaid are known as a "filter" so that in apparatus of the kind concerned embodying such a filter, the continuously driven sprocket is sometimes termed a "filtered sound sprocket."

Moreover, in film feed mechanism of the kind herein referred to, the freely rotatable drum or the like is provided on a spindle which is customarily mounted in anti-friction bearings and fitted with another balanced flywheel. In the case of sound reproducing apparatus, the said drum or the like is employed primarily to eliminate or at least reduce what is known as "film ripple or flutter"—a phenomenon resulting from the interrupted motion of the film and responsible for poor sound reproduction. In some forms of talking picture equipment the freely rotatable drum or the like serves also as the means for guiding and supporting the moving film with its sound track in proper register with the slit of light projected on to it by suitably illuminated optical means. But, in other designs, where the film travels around a fixed guide or support during its passage past the optical unit the freely rotatable drum or the like is provided at a location between the said fixed guide or support and the positively driven sound sprocket.

But, in any event, in such feed mechanisms as heretofore constructed, rotation of the drum or the like has been effected by the traveling film alone, that is to say solely by reason of the frictional contact of the film with the said drum or the like. Accordingly the speed of the freely rotating drum or the like has tended to vary as a consequence of which relative slipping movement has occurred between the latter and the film.

The principal object of the present invention is to provide an improved arrangement of the feed mechanism whereby this slip will be eliminated.

Another object is to provide a generally improved sound film feed mechanism of a particularly compact form as will be hereinafter described.

According to the invention means through the medium of which the drive to the sound sprocket shaft is transmitted are associated with a sleeve or sleeve-like part which is mounted to turn about the spindle of the freely rotatable drum or the like suchwise that when the mechanism is running and the drum or the like is being revolved by the film passing around it, the said sleeve or sleeve-like part assists in maintaining constant the speed of the rotating drum or the like.

The idea is that the continuously driven sleeve or sleeve-like part shall, by reason of its close proximity to and its rotation about the axis of the spindle of the drum or the like, produce a pull or like effect upon the latter tending to maintain its rotation and thereby prevent the occurrence of slip between it and the film. In this way, improved sound recording, printing or sound reproduction, as the case may be, is ensured. It is to be clearly understood, however, that apart from the aforementioned phenomena resulting in the pull or like effect, there is no direct connection or frictional engagement between the sleeve or sleeve-like part and the spindle aforesaid.

Although as will be appreciated, the invention is not necessarily limited in this respect, it is principally the intention to apply it to the sound head of a talking picture projector.

A specific example of the invention applied to such a sound head will now be briefly described with reference to the accompanying diagrammatic drawing, wherein, Figure 1 shows, in side elevation, a general layout of the sound head, Figure 2 is for the most part a vertical sectional view of the same taken on the line II—II of Figure 1, and, Figure 3 is a detail vertical sectional view taken on the line III—III of Figure 2 showing the spring filter.

Like parts are designated by similar reference characters throughout the drawing.

Referring to the drawing it will be seen that the sound head illustrated comprises a continuously driven sound sprocket 1 which is furnished with teeth 1a for engagement with sprocket holes in the film f (Figure 1), and a freely rotatable drum 2 around which the film passes in frictional contact therewith to smooth out the slight interruptions of speed resulting from the engagement of the teeth with the holes. As a matter of interest it may be added that there are about 5,760 of such interruptions per minute and it is these interruptions which, if unchecked, produce film "ripple or flutter." In this example the sprocket 1 is driven from a driver gear 3 through the medium of gears 4, 5 and 6. The gear 4 meshes with the driver gear 3, the two gears 4 and 5 are yieldably connected by a spring filter device 7 and the gear 6 is secured upon a shaft 8 carrying the sprocket 1. The driver gear 3 is in turn driven at the appropriate speed either by or from an independent motor or other suitable power unit, or by or from any convenient continuously rotating part of the projector. The exterior surface of the drum 2 is plain, i. e. free from teeth, and the drum is arranged to guide and support the film f with its sound track in proper relation with respect to a light slit produced at 9 by a lamp 10 in conjunction with an optical unit 11. Light passing through the sound track of the film is projected on to a photo cell 12 by which light variations are translated into volumes of audible speech and tone, all in accordance with known practice. The drum 2 is made hollow to accommodate the inner end of the photo cell 12.

To protect the filtered sound sprocket from the uneven take-up of the bottom spool of the apparatus (not shown), the sound head also includes a further sprocket 13 which is arranged as shown and adapted to be driven either directly or indirectly from the driver. In the specific example illustrated this bottom "hold-back" sprocket 13 is carried by a shaft 14 to which is secured a gear 15 arranged in mesh with a gear 16 directly coupled to the gear 4 in the manner hereinafter to be described. At 17 in Figure 2 is indicated a belt drive to the bottom spool box.

As shown in Figure 2, the rotary drum 2 is provided on one end of a spindle 18 which latter is free to revolve in ball races 19 and 19¹ housed within a bearing sleeve 20 and which at its end remote from the said drum is fitted with a balanced flywheel 21.

In accordance with the essential distinguishing feature of the present invention the train of gears 3, 4, 5 and 6 is associated with a sleeve 22 which is mounted to turn about the drum spindle 18. This sleeve which is located between the end ball race 19¹ and the flywheel 21, is mounted on ball races 23 or equivalent anti-friction bearings. The sleeve 22 moreover, is formed with a flange 22a to which the two gears 4 and 16—arranged side by side upon the sleeve—are rigidly secured, e. g. by means of screws 24. It is this sleeve which assists in maintaining the speed of the drum 2 constant.

Also mounted upon the sleeve 22, and free to turn relatively thereto, to the extent permitted by the spring filter device 7, is a further sleeve 25 to which are rigidly secured the gear 5 and an associated balanced flywheel 26. As will be seen, the gear 5 is interposed between the flywheel 26 and a flange 25a on the sleeve 25, these three parts being secured together by screws 27 passed through the last mentioned flange. The flanged sleeve 25, together with the associated flywheel 26, are held in position, axially, upon the sleeve 22 by means of a collar 28 secured upon the latter.

The spring filter device 7, in this particular example, consists, as depicted in Figure 3, of a pair of opposed springs arranged as shown with one end of each spring anchored at 29 to the flange 22a and the opposite end similarly anchored at 30 to the opposed flange 25a.

The arrangement described is therefore such that the flywheel 26 and the associated spring filter 7 are co-axial with the drum 2 and its spindle 18, the two flywheels being arranged closely side by side and the whole providing a particularly compact construction.

If desired, the spring filter may be replaced by a filter of any other conventional form.

What I claim is:

1. Feed mechanism for sound film comprising, in combination, a sound sprocket having teeth for engagement with spaced sprocket holes in the film, a driver gear, drive-transmitting means for transmitting a continuous drive from the driver gear to the said sprocket, a drum around which the film passes in frictional contact therewith to smooth out the interruptions of speed resulting from the engagement of the teeth with the sprocket holes, a freely rotatable spindle carrying the said drum, a flywheel fitted to the said spindle, a sleeve surrounding the spindle, anti-friction devices provided between said spindle and the sleeve, said sleeve being associated with and thereby adapted to be positively driven through the said drive-transmitting means, a second flywheel, a second sleeve mounted upon the first mentioned sleeve and having the second flywheel secured thereto, and a filter connecting the two sleeves, all for the purpose herein described.

2. Feed mechanism for sound film comprising, in combination, a sound sprocket having teeth for engagement with spaced sprocket holes in the film, a driver gear, a train of gears for transmitting a continuous drive from the driver gear to said sprocket, a drum around which the film passes in frictional contact therewith to smooth out the interruptions of speed resulting from the engagement of the teeth with the sprocket holes, a freely rotatable spindle carrying the said drum, a flywheel fitted to the said spindle, a sleeve surrounding the spindle, anti-friction devices provided between said spindle and the sleeve, said sleeve being rigidly secured to one of the aforesaid gears and thereby adapted to be positively driven, a second flywheel, a second sleeve mounted upon the first mentioned sleeve and having the second flywheel secured thereto, and a filter connecting the two sleeves, all for the purpose herein described.

3. Feed mechanism for sound film comprising, in combination, a sound sprocket having teeth for engagement with spaced sprocket holes in the film, a driver gear, a train of gears for transmitting a continuous drive from the driver gear to the said sprocket, a drum around which the film passes in frictional contact therewith to smooth out the interruptions of speed resulting from the engagement of the teeth with the sprocket holes, a freely rotatable spindle carrying the said drum, a flywheel fitted to the said spindle, a sleeve surrounding the spindle, antifriction devices provided between said spindle and the sleeve, said sleeve being rigidly secured to one of the aforesaid gears and thereby adapted to be positively driven, a second flywheel, a second sleeve mounted upon the first mentioned sleeve and having the said second flywheel and another of the gears of the aforesaid train secured thereto, and a filter connecting the two sleeves, all for the purpose herein described.

4. Sound film feed mechanism according to claim 2, wherein the two flywheels are arranged closely side by side.

5. Feed mechanism for sound film comprising, in combination, a sound sprocket having teeth for engagement with spaced sprocket holes in the film, a driver gear, a train of gears for transmitting a continuous drive from the driver gear to the said sprocket, a smooth drum around which the film passes in frictional contact therewith to smooth out the interruptions of speed resulting from the engagement of the teeth with the sprocket holes, a freely rotatable spindle carrying the said drum, a flywheel fitted to the said spindle, a flanged sleeve surrounding the spindle, ball bearings provided between the spindle and the sleeve, said sleeve being rigidly secured to one of the gears of the said train and thereby adapted to be positively driven, a second flanged sleeve mounted upon the first mentioned sleeve, with the respective flanges opposed, a second flywheel secured to said second sleeve and located adjacent said first mentioned flywheel, another of said gears secured to said second sleeve, and a spring filter located between the opposed flanges and serving to connect the two sleeves, all for the purpose herein described.

6. Feed mechanism for sound film comprising, in combination, a sound sprocket having teeth for engagement with spaced sprocket holes in the film, a driver gear, drive-transmitting means for transmitting a continuous drive from the driver gear to said sprocket, a drum around which the film passes in frictional contact therewith to smooth out the interruptions of speed resulting from the engagement of the teeth with the sprocket holes, a freely rotatable spindle, said drum being carried by one end of said spindle, a flywheel secured to the opposite end of said spindle, a sleeve surrounding the spindle, antifriction devices provided between said spindle and the sleeve, said sleeve being associated with and thereby adapted to be positively driven through the drive-transmitting means, a second flywheel, a second sleeve mounted upon the first mentioned sleeve and having the second flywheel secured thereto, and a filter connecting the two sleeves, all for the purpose herein described.

ALFRED EDWIN MYNARD.

REFERENCES CITED

The following references are of record in the file of this patent:

UNITED STATES PATENTS

| Number | Name | Date |
| --- | --- | --- |
| 2,108,337 | Hoffman | Feb. 15, 1938 |